United States Patent
Chang et al.

(10) Patent No.: US 8,683,125 B2
(45) Date of Patent: Mar. 25, 2014

(54) TIER IDENTIFICATION (TID) FOR TIERED MEMORY CHARACTERISTICS

(75) Inventors: Jichuan Chang, Sunnyvale, CA (US);
Kevin T Lim, La Honda, CA (US);
Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 91 days.

(21) Appl. No.: 13/286,681

(22) Filed: Nov. 1, 2011

(65) Prior Publication Data
US 2013/0111107 A1    May 2, 2013

(51) Int. Cl.
*G06F 12/00*    (2006.01)

(52) U.S. Cl.
USPC ........... 711/117; 711/206; 711/158; 711/169; 711/E12.016; 711/E12.049

(58) Field of Classification Search
None
See application file for complete search history.

(56) References Cited

U.S. PATENT DOCUMENTS

| | | |
|---|---|---|
| 6,763,347 B1 | 7/2004 | Zhang |
| 7,051,177 B2 | 5/2006 | Le et al. |
| 7,093,149 B2 | 8/2006 | Tsirkel et al. |
| 7,685,376 B2 | 3/2010 | Zimmer et al. |
| 7,924,648 B2 | 4/2011 | Sokolov et al. |
| 2005/0044547 A1* | 2/2005 | Gipp ............................ 718/100 |
| 2007/0136523 A1* | 6/2007 | Bonella et al. ............... 711/113 |
| 2007/0204137 A1* | 8/2007 | Tran ............................. 712/214 |
| 2010/0042786 A1* | 2/2010 | Bell et al. ...................... 711/121 |
| 2011/0029735 A1 | 2/2011 | Chiang et al. |
| 2011/0161597 A1* | 6/2011 | Tremaine et al. ............. 711/133 |

OTHER PUBLICATIONS

Evan P.C. Jones et al, Low Overhead Concurrency Control for Partitioned Main Memory Databases, 12 pages, Jun. 6-11, 2010.
Kevin Lim et al, Disaggregated Memory for Expansion and Sharing in Blade Servers, 12 pages, Jun. 20-24, 2009.

* cited by examiner

*Primary Examiner* — Matthew Bradley
*Assistant Examiner* — Arvind Talukdar

(57) ABSTRACT

A tier identification (TID) is to indicate a characteristic of a memory region associated with a virtual address in a tiered memory system. A thread may be serviced according to a first path based on the TID indicating a first characteristic. The thread may be serviced according to a second path based on the TID indicating a second characteristic.

12 Claims, 5 Drawing Sheets

US 8,683,125 B2

TIER IDENTIFICATION (TID) FOR TIERED MEMORY CHARACTERISTICS

STATEMENT OF GOVERNMENT RIGHTS

This invention was made with Government support under Contract No. DE-SC0005026 awarded by the Department of Energy. The Government has certain rights in this invention.

BACKGROUND

A tiered memory system may reduce costs, but may be associated with complexities such as poor application software portability. Further, a tiered memory system may incur overhead such as blocking other threads from executing while a faulting thread waits on slow tier memory access to complete.

BRIEF DESCRIPTION OF THE DRAWINGS/FIGURES

The present examples will now be described with reference to the accompanying drawings. In the drawings, like reference numbers may indicate identical or functionally similar elements.

DETAILED DESCRIPTION

In examples provided herein, a lightweight memory interface may expose tiered memory access and enable improved application performance and other properties (such as energy efficiency and resilience). The memory interface may be portable and easy to implement, with nearly no runtime overhead or risk.

Figure 1:
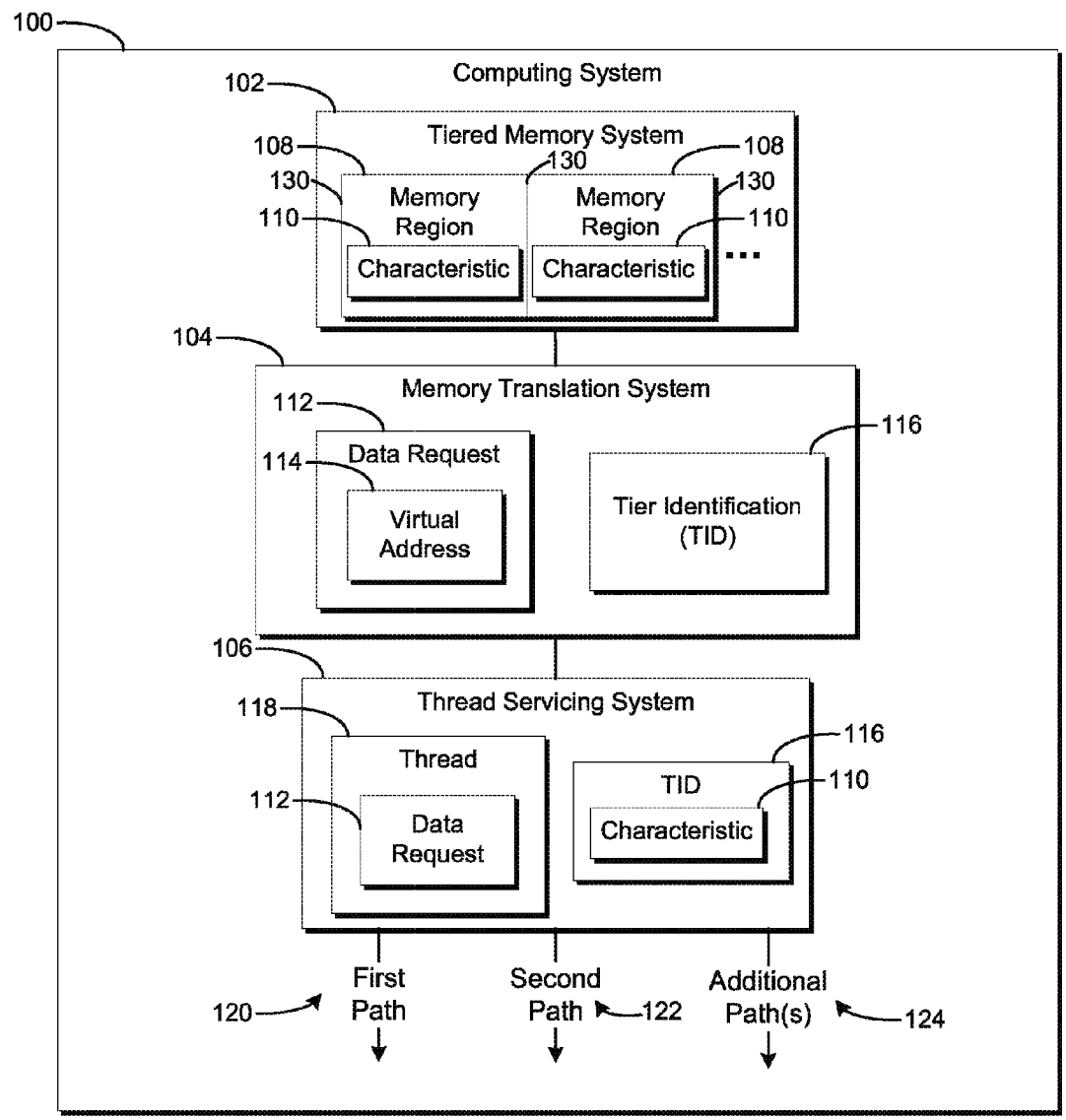
FIG. 1 is a block diagram of a computing system according to an example.

FIG. 1 is a block diagram of a computing system 100 according to an example. The computing system may include a tiered memory system 102, a memory translation system 104, and a thread servicing system 106.

A computing system 100 may be used in analytics and transactional workloads to process large amounts of data in real time. Main memory, including Random Access Memory (RAM), may be used as a primary or caching store (e.g., memcached, RAMCloud, in-memory databases, etc.). In order to provide good performance and large main memory capacity, Dynamic Random Access Memory (DRAM) may be used. However, due to DRAM density, power and system scaling limits, such in-memory systems are likely to be very expensive.

Disaggregated memory, such as Negated AND (NAND) Flash and other dense non-volatile memories, can provide a given amount of capacity at much lower hardware cost and power compared to DRAM. However, performance characteristics such as memory access speed/latency are also much slower/worse than DRAM.

Different memory technologies may be combined in a tiered memory system (e.g., a small and fast DRAM tier with a large but slower Flash tier) to potentially satisfy the large memory requirement at a much lower cost, unify different tiers of memory, and expose the memory structure to software to enable further optimizations not available when the memory structure is unexposed.

Tiered memory hardware may be exposed to application software based on multiple options. For example, a software managed tiered memory may manage the data placement and access explicitly. In contrast, a lightweight interface may expose only the heterogeneous access performance, such that the specifics of managing tiered memory data placement and movement are unexposed (e.g., access by a programmer/application to memory management of a tiered memory system is restricted). A lightweight approach is described herein, to expose tiered memory to software so a system may adapt to expected memory region characteristics (such as access latency) on a per-access basis to improve performance. Thus, a system may be able to detect slow memory accesses before actually accessing the data, providing the opportunity to suspend a thread, free up resources, and/or avoid blocking other threads from executing. These benefits may be enabled by exposing the memory system, such that a computing system does not have to rely exclusively on an Operating System (OS) scheduler to potentially detect blocking behavior after a memory access has been attempted. Although an OS may belatedly preempt a faulting thread when a memory access is unsuccessful, the computing system may incur overhead due to OS scheduling intervals and context switching overhead associated with such an approach.

In contrast, the system described herein exposes the memory system and enables the computing system to pre-emptively detect slow access or other memory region characteristics, and enable an application to adapt to potential long-latency events and/or other characteristics associated with memory regions and their stored data. A hardware/software interface of a tiered memory system may enable cost-effective large-memory systems having high-performance, reducing complexity and improving application software portability across hardware and software managed tiered memory systems.

The tiered memory system 102 may include a plurality of memory regions 108. A memory region may be associated with a memory region boundary 130. A memory region boundary 130 may indicate a transition between one memory region 108 to another. A memory region 108 may be associated with a characteristic 110. Each memory region 108 may be disjoint from other memory regions, and each characteristic 110 may be different across different memory regions 108. Characteristic 110 of a memory region 108 may include performance, cost, power, energy efficiency, volatility, retention attributes, endurance attributes, resilience attributes, and other characteristics. A memory region 108 may be associated with multiple characteristics 110, to indicate properties other than, e.g., access latency of that memory region 108. An entire physical memory space of the tiered memory system 102 may be partitioned, and software may exploit such tier characteristic information to make information decisions on how to use different tiers of memory (e.g., memory regions 108) and how to adapt a computing system 100 to such a tiered memory system 102.

In an example, the characteristic 110 may be associated with energy required for accessing data. Accordingly, on a per-access basis, a system may identify what level of different energy requirements is associated with each memory access. Accessing and/or writing data may be associated with energy requirements and certain timing opportunities, such as limited writing/low write endurance. The characteristic 110 may then identify situations for optimizing efficiency and preserving resiliency. For example, data may be written to a less-limited tier, such that intensive operations may be performed in that tier, before writing the data back to the more-limited tier. Data may be moved to other locations for allowing operations, before writing the data back. Accordingly, overall efficiency and system robustness may be improved.

Memory translation system 104 may be associated with a data request 112 and a tier identification (TID) 116. The data request 112 may be associated with a virtual address 114. The TID 116 may be obtained based on a function, data request 112, and/or library call, such as TID=getTID(VirtAddress). GetTID may be implemented either as a hardware instruction or a software primitive, using virtual address 114 provided by the data request 112. For a given virtual address 114 in data request 112, getTID may return the tier ID of the memory region where the data corresponding to the address is stored.

In a hardware implementation, TID 116 may be obtained by translating the virtual address 114 to a physical address, and identifying the TID based on the corresponding memory region 108 associated with that physical address. A virtual memory management interface may be used, wherein an Operating System (OS) may perform memory translation and may use a Translation Lookaside Buffer (TLB). In an example, a TLB lookup may be used to translate the virtual address into physical/machine address. A page-table walk also may be used to obtain the physical address associated with the virtual address 114, such as when the physical address is not cached in, or otherwise missing from (e.g., previously replaced and/or evicted from), the TLB. The memory region 108 associated with the physical address may be determined based on the current memory region boundaries 130. In an example, a memory region 108 may be identified by checking a physical address to determine within which memory region boundaries 130 the physical address is located. The tiered memory system 102 may include a memory space divided by memory region boundaries 130. A tier/memory region in the memory space may be determined by comparing a memory address with the memory region boundaries 130, and identifying the memory region 108 and associated characteristic 110 based on what memory region boundaries 130 the address falls between.

The memory region 108 may be associated with a characteristic 110 and a corresponding TID 116. An indication of the TID 116, corresponding to a virtual/physical address, may be stored in a virtual memory management interface, such as storing TID 116 in a TLB that may be accessed when performing memory translations. Thus, the TID 116 may be utilized in a way that is transparent to the OS for interfacing with software.

A condition may arise such that the virtual address 114 is not mapped to a physical address, or otherwise not associated with a memory region 108 (and associated characteristic 110). In such situations, a data request 112 (e.g., a getTID function) may return a TID 116 based on a special, designated, approximate, default, and/or other TID 116. For example, a default TID 116 may correspond to a lowest tier characteristic. A TID 116 for a virtual address 114 unassigned to a physical address may be associated with a tier characteristic that is lower tier than another TID 116, such as a previously obtained TID 116. An approximate TID 116 may be assigned a characteristic based on an estimated delay. For example, a TID 116 for a virtual address 114 unassigned to a physical address may be associated with a characteristic related a total latency of obtaining a physical memory, such as performing a page table walk, performing a memory mapping, or other characteristic (e.g., total latency corresponding to steps that would be taken to obtain the physical address and/or perform mapping between the virtual and physical memory addresses). The TID 116 may approximate and account for such latencies, including operations performed by the OS and/or associated memory management systems. A TID 116 may be associated with a non-tier identification, for example, wherein a worst-case or other default characteristic is associated with the non-tier identification.

The memory translation system 104 may implement functions/data requests 112 for obtaining TID 116 without compromising security. For example, a function such as getTID may be limited to query only its own virtual address and return only the associated TID 116. The function to obtain TID 116 may be prevented from accessing or affecting any other memory locations or data contents. Accordingly, getTID may not raise security/privacy concerns regarding the functionality of providing TID 116 and associated benefits. The getTID function may be limited to checking only its own data placement, identifying roughly what tier a data item is associated with, while avoiding a check for a specific memory location of other data items.

Data stored in a physical address may be moved from one memory region 108 to another to obtain desired characteristics, before, during, and/or after memory access. Without loss of generality for system associated with more than two tiers, consider an example having a two-tiered memory system consisting of tier-1 DRAM local to at least one processor, and tier-2 memory (hybrid of DRAM and NAND Flash) remote to the at least one processor. A hardware or software subsystem may move data between tiers, on-demand or speculatively, such that accesses to the tiered memory may hit in tier-1. The TID of the data may reflect such changes in memory region and hence memory characteristics of the data.

The thread servicing system 106 may be associated with a thread 118 and the TID 116. The thread 118 may be associated with the data request 112, and the TID 116 may be associated with a characteristic 110. At least one thread may be associated with a process of a computing system, such that multiple threads may be associated with the process. A thread may be executed separately and/or as part of a process. A process may share memory spaces. Each thread may have its own page table, memory space, and other associated resources, and may be isolated without sharing a memory space with another thread.

The thread servicing system 106 may service the thread 118 based on a first path 120, a second path 122, and at least one additional path 124. An instruction (e.g., getTID) may be provided to dynamically check a TID 116 (hence expected characteristic, such as access latency) associated with a virtual address 114, which may be straightforward to implement with little or no runtime overhead.

A software code pattern may use the getTID instruction to enable non-blocking execution, prefetching, and speculation to improve performance. The getTID instruction may be implemented, e.g., in a tiered memory managed by software, by using a bound check to allow that application/software code pattern to work with both hardware-based and software-based tiered memory.

The first path 120 may be associated with a fast path, and may involve a quick execution path when the TID 116 and characteristic 110 correspond to the first path 120. The second path 122 may be associated with a non-fast (e.g., slow) execution path. If the TID 116 and characteristic 110 correspond to the second path 120 (slow/long path), then the computing system 100 may speculatively launch/execute the thread 118, and may use data fetching and other techniques to operate with data in a faster tier/memory region 108 while also enabling other actions/threads to be serviced. Thus, the computing system 100 may choose whether to use a fast or slow path (e.g., first path 120 or second path 122), by deciding initially before actually having to attempt to access data corresponding to the virtual address 114.

An example step in program execution, e.g., an if-else branch, may be associated with two code paths. An outcome of each path, including potential delays, may depend on where the associated data for that path is stored, and/or what tier of performance is associated with the memory region 108 and/or characteristic 110. Even in situations where the program execution of the if-else branch may usually take a fast/first path 120, the computing system 100 may know in advance, via the TID 116, when a slow/second path 122 will be taken. Accordingly, the computing system 100 may take steps to prevent the if-else branch from blocking other threads while the second path 122 is resolved.

The getTID instruction (or another variant of getTID instruction; the thread 118) may be implemented by combining the check TID 116 functionality with prefetching, including non-blocking prefetching. The instruction may work on returning the TID 116 information, while in the background the computing system 100 may issue a prefetching request for the associated data.

Execution of thread 118 may involve a request for data, such as data located a physical address that is mapped to a virtual address 114. Before requesting data, the thread 118 may first call getTID to see if such data access will be associated with a characteristic 110 such as slowness or high-latency etc. The tiered memory may already be organized to provide very high hit rate in memory regions 108 having desired characteristics 110 (e.g., tier-1). Thus, a branch for the thread 118 may be more likely to take the fast/first path 120. The first path 120 may be a very predictable branch for modern processors, and by adding the check for a TID 116 to the original fast-path code should take nearly zero runtime penalties due to the accessible information regarding performance tiers/characteristics 110 of the memory regions 108. In the less-frequent situation where the slow/second path 122 is taken, multiple options exist to conduct useful work while waiting for data. For example, the faulting thread 118 may enter speculative execution mode to run-ahead before the data gets back. The thread 118 may initiate prefetching then yield hardware resources to other threads, and resume after the data is fetched from the slow tier memory.

In an example, a getTID function may be implemented in a code pattern as follows:

```
// Accessing large memory data structure
if (getTID (&data) > 0) {
    // take the slow path. For example, prefetch and abort as shown here:
    append(&data, prefetch_queue);
    // will retry after expected slow tier access latency
    transaction_sleep (expected_latency);
} else { // common case branch, easy-to-predict, nearly no runtime overhead
    // fast path: continue accessing and processing data
    ... ...
}
```

Figure 2:
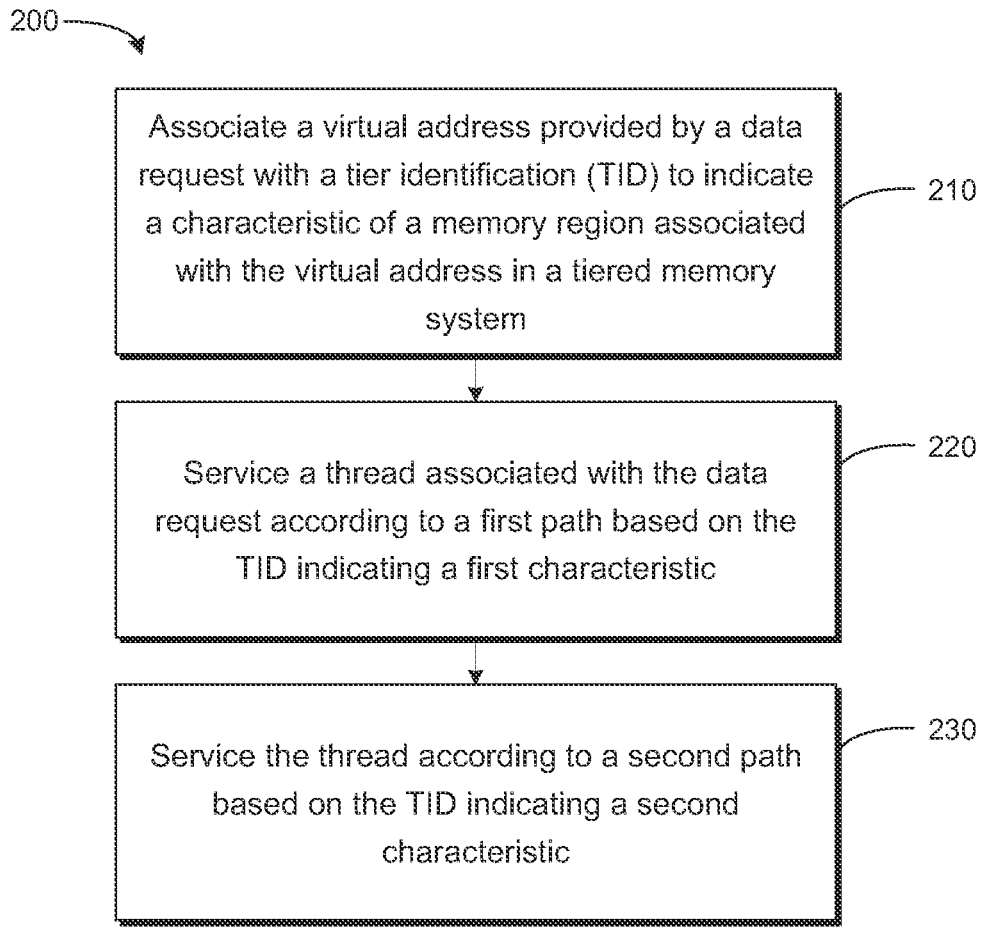
FIG. 2 is a flow chart based on a method of servicing a thread based on a Tier Identification (TID) according to an example.

FIG. 2 is a flow chart 200 based on a method of servicing a thread based on a Tier Identification (TID) according to an example. In block 210, a virtual address provided by a data request may be associated with a tier identification (TID). The TID may indicate a characteristic of a memory region associated with the virtual address in a tiered memory system. In an example, a memory region may be associated with at least one characteristic, such that the TID may be associated with at least one characteristic. For example, a TID may indicate that data stored in a corresponding memory region may be accessed with low-latency and low-power. In block 220, a thread associated with the data request may be serviced according to a first path based on the TID indicating a first characteristic. In an example, the TID may indicate that data will be accessed very quickly due to low-latency, so that the thread is serviced according to a fast path associated with the first path. In block 230, the thread may be serviced according to a second path based on the TID indicating a second characteristic. In an example, the TID may indicate a potentially slow memory access due to a memory region of the accessed data being high-latency, such that the thread may be serviced according to a slow/second path. In an example, the thread also may be serviced according to additional paths, including paths based on memory endurance, power requirements, memory volatility, and the like.

In an example, a database may be implemented using a data structure such as a B-tree. The structure may be arranged such that a top of the B-tree is smaller and typically accessed more frequently. Accordingly, data associated with the top of the B-tree may be placed in a memory region associated with high performance (fast memory that is expensive), i.e., a higher ranked tier/TID, such as tier 1. Data associated with a lower portion/bottom of the B-tree (including leaf nodes) may be associated with memory regions that may have lower performance (slow memory that is more affordable), i.e., a lower tier/TID, such as tier 2. Thus, memory accesses to data stored in tier 2 may take longer than tier 1, and so tier 2 accesses may be performed in the background while other tasks are performed due to the duration of the tier 2 accesses. In an example, a code pattern may instruct the use of getTID to obtain a TID associated with data to be accessed. The TID may enable, for example, a system to determine whether data is stored at the top of the B-tree, e.g., in high performance tier 1 memory, or stored in a lower portion of the B-tree in lower performance memory. If the data is stored in a slower tier, the code path may execute on a second path corresponding to the slow path. For example, a command associated with a thread to be executed may be appended to a prefetch queue so that data may be prefetched while the thread is suspended. Resources associated with the thread, such as one or more processors (e.g., Central Processing Unit(s) (CPU)), may be freed up for use by other tiers while the thread is suspended and prefetching for that thread is carried out. In contrast, if the TID indicates that the data is stored in a fast tier, the code may execute according to a fast path whereby the thread is executed immediately. The check for TID may occur before the system has actually accessed the data, so the system may thereby identify when data may be delayed. Thus, the system may take alternate steps and avoid blocking execution of other threads, because the system knows ahead of time the characteristics of the memory region, such as whether the corresponding data will be accessed quickly or more slowly depending on what tier/characteristic is associated with data storage locations.

Additionally, there is very little or no impact to performance associated with checking the TID, which may be implemented as part of a check in the TLB, for example. A command such as getTID may be very light in terms of overhead. A hypervisor or other memory management system associated with tiered memory and data placement may arrange frequently accessed data in higher performance tiers. Thus, the TID may help improve the efficiency of a memory management system placing data in higher/lower tiers of the memory system. When the system takes the fast path, e.g., using hardware, a function using TID (e.g., getTID) may be executed at run-time, without adding much execution time to operations. A memory management system may achieve synergy with the getTID function, enabling faster execution, benefitting branch prediction and other memory management enhancements, and allowing a system to identify possibilities for faster code execution and hardware implementation. GetTID may be implemented in software with little impact to system performance, enabling software to perform a calculation (e.g., bound check) to identify a TID based on a physical and/or virtual address and memory region boundaries.

GetTID may be implemented on a per-access basis. A system may check TID every time a data access is performed, enabling the system to gather information regarding whether to wait/suspend a thread before even having to access the referenced data. Such information may be gathered over time, potentially increasing the benefits even further.

Figure 3:
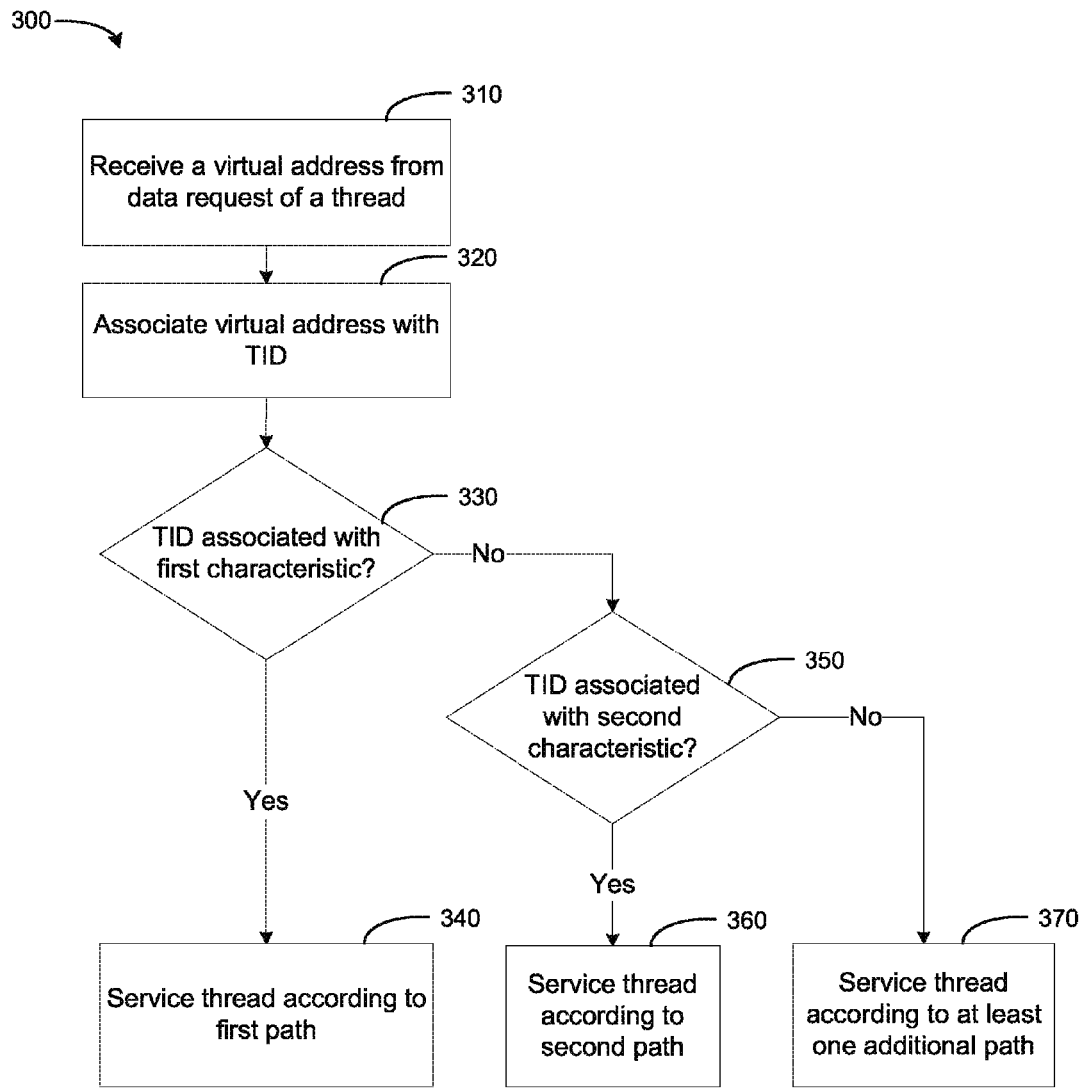
FIG. 3 is a flow chart based on a method of servicing a thread based on a TID according to an example.

FIG. 3 is a flow chart 300 based on a method of servicing a thread based on a TID according to an example. In block 310, a virtual address is received from a data request of a thread. In block 320, a virtual address is associated with a TID. In block 330, it is determined whether the TID is associated with a first characteristic. If the TID is associated with a first characteristic, the thread may be serviced according to a first path per block 340. If the TID is not associated with a first characteristic, control proceeds to block 350. In block 350, it is determined whether the TID is associated with a second characteristic. If the TID is associated with a second characteristic, the thread may be serviced according to a second path per block 360. If the TID is not associated with a second characteristic, the thread may be serviced according to at least one additional path per block 370.

A thread may be serviced according to various scenarios. A tiered memory system may include multiple memory regions, each associated with a different characteristic. Each memory region may be associated with multiple characteristics. For example, one region may be associated with characteristics of fast, high-performance memory that is highly volatile and low endurance. Thus, a TID associated with a multi-characteristic memory region may execute according a first path 340, a second path 360, and various additional paths 370 depending on which characteristics are involved. Paths may be combined and/or rearranged.

Figure 4:
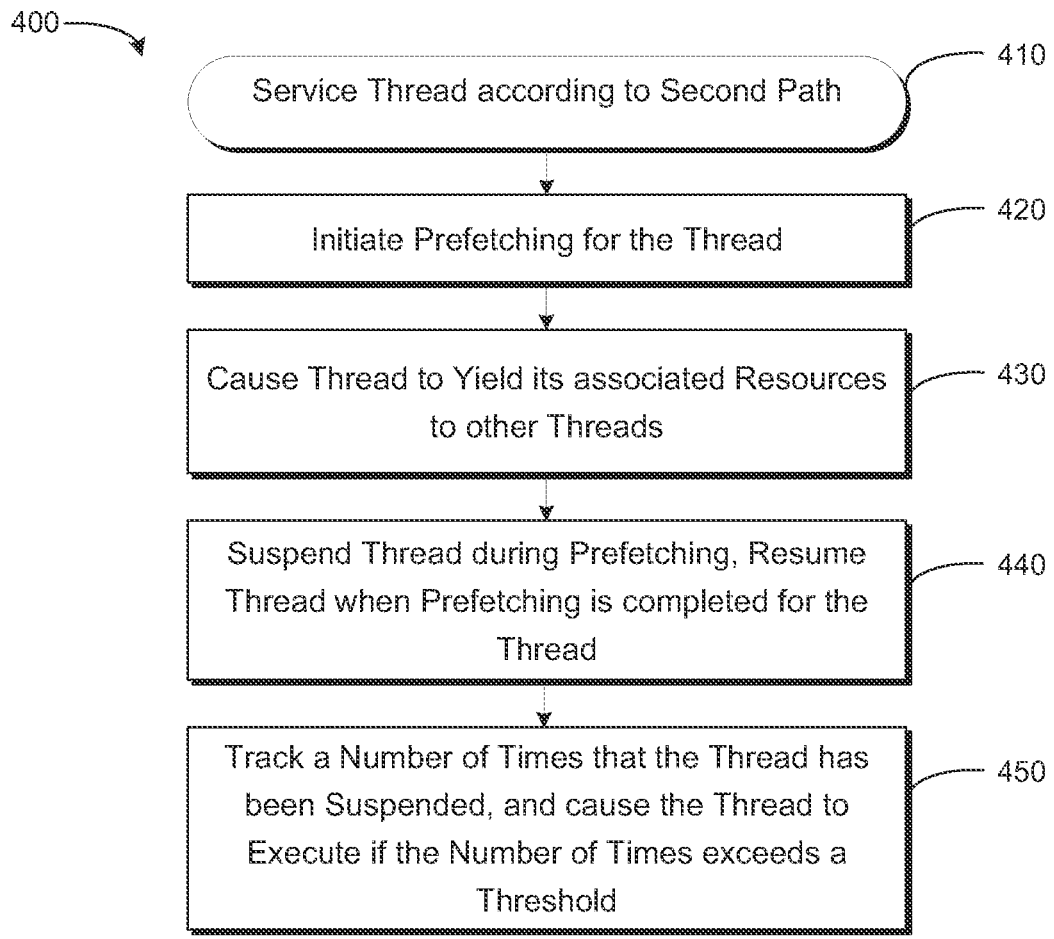
FIG. 4 is a flow chart based on a method of servicing a thread based on a second path according to an example.

FIG. 4 is a flow chart 400 based on a method of servicing a thread based on a second path according to an example. The flow chart 400 begins with block 410, indicating that a thread is serviced according to a second path. Each of the blocks in flow chart 400 may be selectively performed, and servicing of a thread may not involve every block illustrated in FIG. 4. These operations may be performed in hardware or software. In block 420, prefetching for the thread may be initiated. For example, a processor may request information associated with the thread before the thread is executed. In block 430, the thread may be caused to yield its associated resources to other threads. In an example, a getTID command may be placed in a command queue and its associated thread may yield its resources so other threads may use the resources. In block 440, a thread may be suspended during prefetching, and may be resumed when prefetching is completed for the thread.

In block 450, a number of times that the thread has been suspended may be tracked, and the thread may be caused to execute if the number of times exceeds a threshold. In an example, when the faulting thread yields control and later comes back to resume execution, there is a slight chance the requested data is moved back to slow tier again during the thread's "sleep interval". In cases like this, the faulting thread may have to "sleep" again, leading to potential starvation or livelock of endlessly sleeping/waking. A computing system may avoid this by keeping track of how many times a thread has entered such "sleep" mode, and force it to execute to the end if the number exceeds a certain threshold. The system may maintain a thread library, and may make a note in the library if a thread sleeps too many times. The thread may be forced to execute without suspension. The data associated with the thread may be prevented from being moved from one tier to another until the thread has executed. Such techniques are exposed to software to enable more flexibility and control, without needing to rely on a hypervisor or OS to manage the tiers.

Identifying the TID provides the system with valuable information regarding expected performance, such as memory access, and may provide that information prior to actually accessing the memory. Accordingly, the system may take steps to manage the system more efficiently, e.g., avoiding blocking a first thread associated with a fast TID by failing to suspend a second thread associated with a slow TID. The system may be managed based on other characteristics as mentioned above, such as power efficiency and other characteristics.

Figure 5:
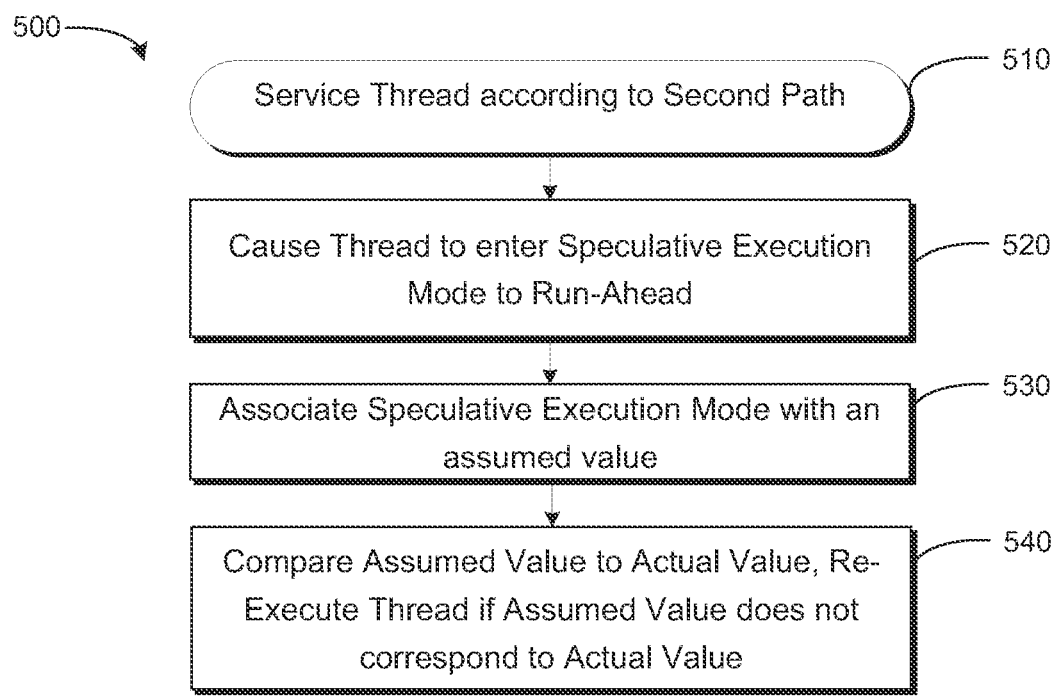
FIG. 5 is a flow chart based on a method of servicing a thread based on a second path according to an example.

FIG. 5 is a flow chart 500 based on a method of servicing a thread based on a second path according to an example. The flow chart 500 begins with block 510, indicating that a thread is serviced according to a second path. Each of the blocks in flow chart 500 may be selectively performed, and servicing of a thread may not involve every block illustrated in FIG. 5. These operations may be performed in hardware or software. In block 520, the thread may be caused to enter speculative execution mode to run-ahead. In block 530, the speculative execution mode may be associated with an assumed value.

In an example illustrating speculation and other features, when a getTID function returns a value indicating slow access, the requesting thread may assume a value for the data (e.g., boolean value RARE_EVENT=0) while the data fetching occurs concurrently in the background, and continue to speculatively execute using that value. Other threads may execute, but there is a point where further speculation is unlikely to be efficient, e.g., when other threads are dependent on the results of the speculatively executed thread. Accordingly, after calling getTID and speculatively executing, speculation may be stopped and the assumed value may be checked (when the data is fetched and value available for fast access). In block 540, an assumed value associated with speculative execution mode of the thread may be compared to an actual value, and the thread may be re-executed if the assumed value does not correspond to the actual value. The assumed value may be checked against an actual value, because it is possible that the actual value may have been determined/returned during speculative execution. If the actual value matches the assumed value, execution may proceed. If the actual value deviates from the assumed value, execution of the speculatively executed thread may be aborted. The aborted thread may be re-executed using the actual value. Such techniques are exposed to software to enable more flexibility and control, without needing to rely on a hypervisor or OS to manage the tiers.

The breadth and scope of the present invention should not be limited by any of the above-described examples, but should be defined in accordance with the following claims and their equivalents.

What is claimed is:

1. A computing system comprising:
   a tiered memory system associated with a plurality of memory regions;

a memory translation system to associate a virtual address provided by a data request with a tier identification (TID) to indicate a characteristic of a memory region associated with the virtual address; and a thread servicing system to:
service a first thread associated with the data request according to a first path based on the TID indicating a first characteristic,
service the first thread according to a second path based on the TID indicating a second characteristic, wherein the second path is a slower path than the first path, and
in response to determining that the data request is associated with the TID indicating the second characteristic, suspend the first thread to avoid blocking execution of a data request of a second thread that is associated with a TID indicating the first characteristic.

2. A computing system comprising:
a tiered memory system associated with a plurality of memory regions;
a memory translation system to associate a virtual address provided by a data request with a tier identification (TID) to indicate a characteristic of a memory region associated with the virtual address; and
a thread servicing system to:
service a thread associated with the data request according to a first path based on the TID indicating a first characteristic, and
service the thread according to a second path based on the TID indicating a second characteristic, wherein, in response to the TID indicating the second characteristic, the thread servicing system is to initiate prefetching for the thread, yield the thread's associated resources to other threads, suspend the thread during the prefetching, and resume the thread when the prefetching for the thread is completed.

3. A computing system comprising:
a tiered memory system associated with a plurality of memory regions;
a memory translation system to associate a virtual address provided by a data request with a tier identification (TID) to indicate a characteristic of a memory region associated with the virtual address; and
a thread servicing system to:
service a thread associated with the data request according to a first path based on the TID indicating a first characteristic, and
service the thread according to a second path based on the TID indicating a second characteristic, wherein, in response to the TID indicating the second characteristic, the thread servicing system is to track a number of times that the thread has been suspended, and cause the thread to execute without suspension if the number of times exceeds a threshold.

4. The computing system of claim 1, wherein the plurality of memory regions are associated with at least one memory region boundary, and the TID is associated with the virtual address based on the at least one memory region boundary.

5. The computing system of claim 1, wherein the tiered memory system includes a first memory region of Dynamic Random Access Memory (DRAM) local to at least one processor, and a second memory region including a hybrid of DRAM and flash memory remote to the at least one processor.

6. A tangible, non-transitory computer-readable medium having instructions stored thereon, the instructions upon execution causing a system to:
associate a virtual address provided by a data request with a tier identification (TID) to indicate a characteristic of a memory region associated with the virtual address in a tiered memory system;
service a thread associated with the data request according to a first path based on the TID indicating a first characteristic;
service the thread according to a second path based on the TID indicating a second characteristic; and
identify that the virtual address is not mapped to a physical address, and in response to the identifying, associate the virtual address to at least one of i) a default TID, and ii) an approximate TID associated with a delay corresponding to a page table walk.

7. The computer-readable medium of claim 6, wherein the characteristic indicates an expected latency of the memory region associated with the virtual address.

8. The computing system of claim 3, wherein the characteristic is based on a memory boundary, the thread servicing system to service the thread based on a bound check, relative to the memory boundary, of a physical address corresponding to the virtual address.

9. The computer-readable medium of claim 6, wherein the characteristic indicates at least one of memory read latency and memory write latency.

10. A method, comprising:
associating a virtual address provided by a data request with a tier identification (TID) to indicate a characteristic of a memory region associated with the virtual address in a tiered memory system;
servicing a thread associated with the data request according to a first path based on the TID indicating a first characteristic;
servicing the thread according to a second path based on the TID indicating a second characteristic, wherein servicing the thread according to the second path comprises:
causing the thread to enter a speculative execution mode to run-ahead, and associating the speculative execution mode with an assumed value, and
comparing the assumed value to an actual value, and re-executing the thread using the actual value if the assumed value does not correspond to the actual value.

11. The method of claim 10, further comprising servicing the thread according to at least one additional path based on the TID indicating at least one additional characteristic.

12. The device of claim 10, wherein the tiered memory system is tiered based on at least one of memory performance, memory cost, memory power, memory energy efficiency, memory volatility, memory retention attributes, memory endurance attributes, and memory resilience attributes.

* * * * *